United States Patent [19]
Phillips

[11] 3,878,248

[45] Apr. 15, 1975

[54] SUBSTITUTED ALPHA, ALPHA-DICHLORO-METHANE-SULFENYL CHLORIDES

[75] Inventor: Wendell Gary Phillips, Olivette, Mo.

[73] Assignee: Monsanto Company, St. Louis, Mo.

[22] Filed: Apr. 13, 1973

[21] Appl. No.: 351,046

Related U.S. Application Data

[62] Division of Ser. No. 139,976, May 3, 1971, Pat. No. 3,770,824.

[52] U.S. Cl...... 260/558 S; 260/239 B; 260/293.73; 260/293.85; 260/326.5 E; 260/465 D; 260/561 S; 260/562 S; 71/98; 424/244; 424/267; 424/274; 424/304; 424/320; 424/324; 260/543 H

[51] Int. Cl............................................. C07c 103/30

[58] Field of Search.................... 260/558, 562, 561

[56] References Cited
UNITED STATES PATENTS

| | | | |
|---|---|---|---|
| 2,815,312 | 12/1957 | Schuler | 424/211 |
| 3,197,498 | 7/1965 | Lorenz et al. | 260/562 |
| 3,542,850 | 11/1970 | Jansen et al. | 260/562 |
| 3,635,997 | 1/1972 | Toepfl | 260/562 |
| 3,646,138 | 2/1972 | Strandtmann | 260/562 |

FOREIGN PATENTS OR APPLICATIONS

| | | | |
|---|---|---|---|
| 1,280,866 | 10/1968 | Germany | 260/562 |

OTHER PUBLICATIONS

Schmolk et al., J. Org. Chem., Vol. 22, p. 1721–1722 (1957).

Hatch et al., Chem. Abstracts, Vol. 71, item 61938z (1969).

Cagmiant et al., Chem. Abst., Vol. 55, col. 27364f (1961).

Chem. Abstracts, Vol. 23, p. 2989, (1929), Abstract of German Patent 474560.

*Primary Examiner*—Harry I. Moatz
*Attorney, Agent, or Firm*—Richard H. Shear; John L. Young

[57] ABSTRACT

Alpha-carbamoyl-alpha,alpha-dichloro-methane-sulfenyl chlorides and their method of manufacture, which compounds are pesticidally active and/or are useful precursors for a variety of pesticides.

12 Claims, No Drawings

SUBSTITUTED ALPHA, ALPHA-DICHLORO-METHANE-SULFENYL CHLORIDES

This is a division, of application Ser. No. 139,976, filed May 3, 1971, now U.S. Pat. No. 3,770,824.

This invention relates to the manufacture of new and useful alpha,alpha-dichloro-methanesulfenyl chlorides of the formula

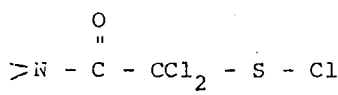

$$>N - C - CCl_2 - S - Cl$$ (with C=O)

from a substituted sulfide of the formula

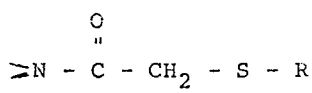

$$>N - C - CH_2 - S - R$$ (with C=O)

and sulfuryl chloride or chlorine, and intermediary products obtained therein described hereinafterwards, wherein

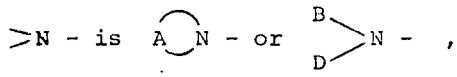

$>N-$ is $A\underset{\smile}{N}-$ or $\overset{B}{\underset{D}{>}}N-$ ,

A is alkylene of the empirical formula $C_nH_{2n}$ wherein n is a whole number from 4 to 8, inclusive, and having from 4 to 8, inclusive, carbon atoms in a continuous chain between the terminal valence bonds. B is hydrogen, alkyl of from 1 to 5 carbon atoms, alkoxyalkyl of from 2 to 6 carbon atoms, cyclopentyl, cyclohexyl, naphthyl, phenyl or substituted phenyl wherein the ring substituents thereof total from 1 to 3 which substituents are from 0 to 3 alkyl of from 1 to 6 carbon atoms, from 0 to 2 alkoxy of from 1 to 6 carbon atoms, from 0 to 3 halogen of atomic weight in the range of 18 to 80, from 0 to 2 nitro, from 0 to 1 cyano, or from 0 to 2 trifluoromethyl, D is hydrogen, alkyl of from 1 to 6 carbon atoms, alkoxyalkyl of from 2 to 6 carbon atoms, cyclopentyl, cyclohexyl, naphthyl, phenyl and substituted phenyl wherein the ring substituents thereof total from 1 to 3, from 0 to 3 alkyl of from 1 to 6 carbon atoms, from 0 to 2 alkoxy of from 1 to 6 carbon atoms, from 0 to 3 halogen of atomic weight in the range of 18 to 80, from 0 to 2 nitro, from 0 to 1 cyano, or from 0 to 2 trifluoromethyl, and R is hydrogen, methyl or benzyl.

Examples of

pyrrolidinyl, piperidinyl, hexamethyleneimino, heptamethyleneimino, octamethyleneimino, 2-ethylpyrrolidinyl, 3-n-butylpyrrolidinyl, 2,5-dimethylpyrrolidinyl, 2,5-diethyl-pyrrolidinyl, 3,4-dimethylpyrrolidinyl, 2-pipecolinyl, 3-pipecolinyl, 4-pipecolinyl, 2,6-dimethylpiperidinyl, 2-ethyl-6-methylpiperidinyl, 2-n-propylpiperidinyl, 3-methylhexamethyleneimino, 3,4-dimethylhexamethyleneimino, and the various isomeric forms thereof. It is preferred that A have from 4 to 6, inclusive, carbon atoms in a continuous chain between the terminal valence bonds. Examples of

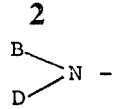

include
anilino
N-methylanilino
N-ethylanilino
N-isopropylanilino
N-isobutylanilino
N-n-amylanilino
N-(methoxymethyl)-anilino
N-(ethoxyethyl)-anilino
N-(isobutoxymethyl)-anilino
N-(n-butoxyethyl)-anilino
N-(3-methoxypropyl)-anilino
N-ethyl-3-chloroanilino
N-isopropyl-2,5-dichloroanilino
N-methyl-3,4-dichloroanilino
N-isopropyl-2,4,5-trichloroanilino
N-methyl-2,4,6-trichloroanilino
N-isopropyl-2,5-dichloro-4-bromoanilino
N-isoamyl-2,6-dichloro-4-bromoanilino
N-n-propyl-2-bromoanilino
N-ethyl-4-fluoroanilino
N-methyl-2-chloro-4-fluoroanilino
N-ethyl-2,6-dichloro-4-fluoroanilino
3-chloroanilino
2,5-dichloroanilino
4-cyanoanilino
3,4-dichloroanilino
2,4,5-trichloroanilino
2,4,6-trichloroanilino
2,5-dichloro-4-bromoanilino
2,6-dichloro-4-bromoanilino
2-bromoanilino
4-fluoroanilino
2-chloro-4-fluoroanilino
2,6-dichloro-4-fluoroanilino
Amido
N-methyl-amido
N-ethyl-amido
N-isopropyl-amido
N-isobutyl-amido
N-n-amyl-amido
N-(methoxymethyl)-amido
N-(ethoxyethyl)-amido
N-(isobutoxymethyl)-amido
N-(n-butoxyethyl)-amido
N-(3-methoxypropyl)-amido
N-methyl-N-ethylamido
N-methyl-N-isopropylamido
N-methyl-N-isobutylamido
N-ethyl-N-isopropylamido
N,N-dimethylamido
N,N-diethylamido
N,N-diisopropylamido
N,N-diisobutylamido
N,N-diamylamido
N,N-di(methoxymethyl)amido
N,N-di(ethoxyethyl)amido
N,N-di(isobutoxymethyl)amido
N,N-di(n-butoxyethyl)amido
N,N-di(3-methoxypropyl)amido
and the like. It is preferred that, when B is naphthyl, phenyl or substituted phenyl, D is hydrogen.

Preferred substituted phenyls have the formula

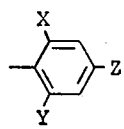 or 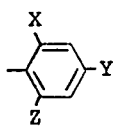

wherein X is halo, tert-alkyl of from 4 to 6 carbon atoms (for example tert-butyl, tert-pentyl and 1,1-dimethyl-n-butyl), wherein Y is halo or primary or secondary alkyl having not more than 4 carbon atoms (for example, methyl, ethyl, n-propyl, n-butyl, isobutyl, isopropyl or sec.butyl) and wherein Z is halo, hydrogen or primary or secondary alkyl having not more than 4 carbon atoms (for example, methyl, ethyl, n-propyl, n-butyl, isopropyl or sec.butyl). Preferred halo are chloro and bromo.

The compounds of this invention are conveniently and efficiently manufactured by reacting in an inert organic liquid medium one molecular proportion of substituted sulfide of the formula

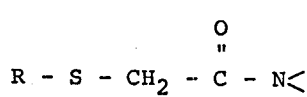

wherein R is benzyl, methyl or hydrogen but preferably hydrogen with at least three molecular proportions of chlorine or sulfuryl chloride at a reaction temperature above the freezing point of the reaction system. The mechanics of this reaction is not completely understood but can be represented by the following chemical equations.

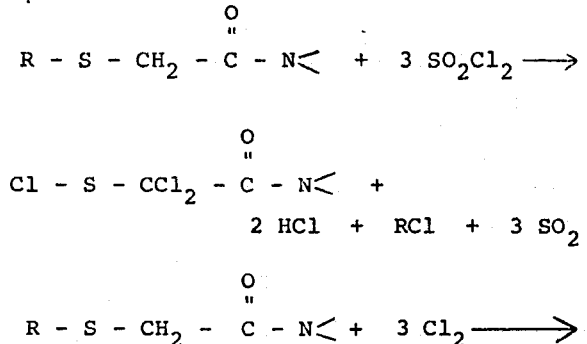

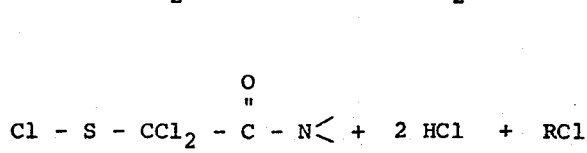

Under mild reaction conditions when R is benzyl or methyl the reaction apparently proceeds in a stepwise fashion which permits the intermediary product

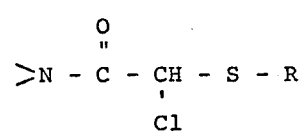

to be recovered. The reaction is postulated as follows:

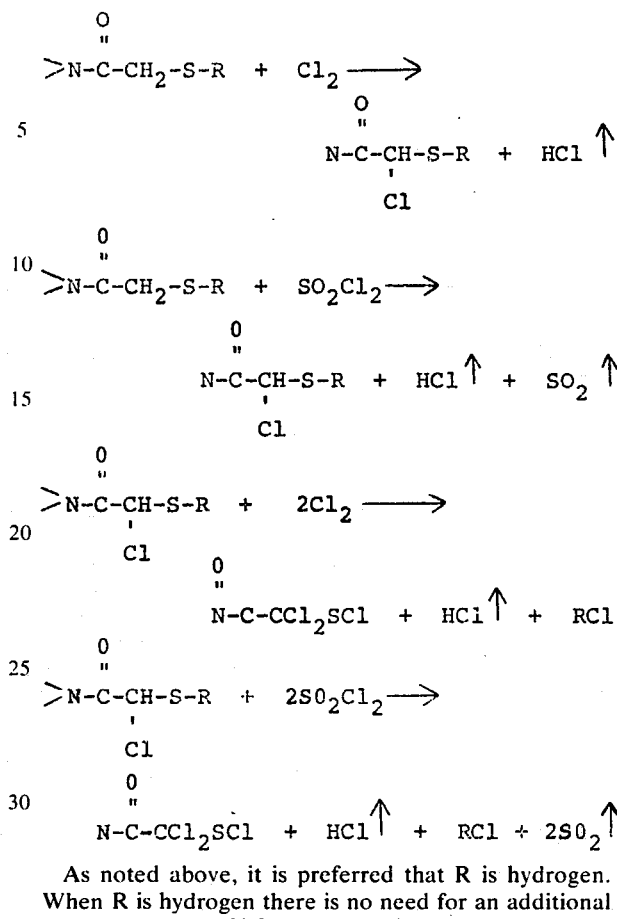

As noted above, it is preferred that R is hydrogen. When R is hydrogen there is no need for an additional step to remove RCl from the product

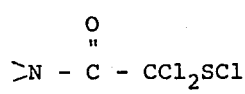

since HCl is a gas at normal reaction temperatures and readily volatilizes from the system.

A precursor sulfide of the formula

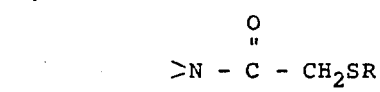

where R is H is readily prepared from the corresponding primary or secondary amine and thioglycolic acid as follows:

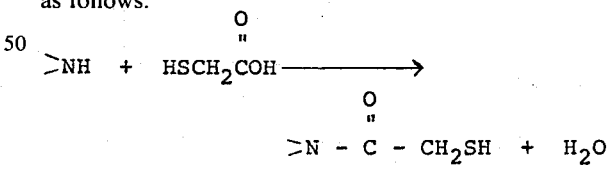

Where R is C₆H₅CH₂ or CH₃ a precursor sulfide is prepared from the corresponding alpha halo acetanilide or acetamide and benzyl mercaptan or methyl mercaptan as follows:

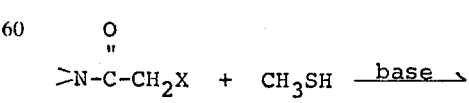

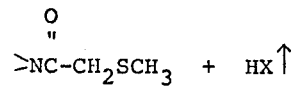

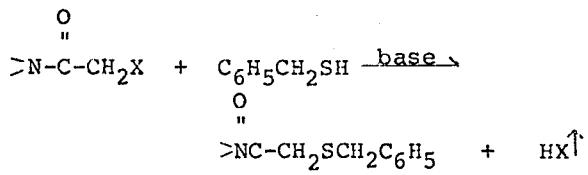

X is halo, preferably iodo, chloro or bromo, and more preferably chloro or bromo. Alpha halo acetanilides or acetamides are commercially available compounds or may be readily prepared from available compounds by known methods. In place of the benzyl or methyl mercaptan which forms the corresponding mercaptide in the presence of a base it may be convenient under certain conditions to use the corresponding sodium mercaptide initially in the above reactions.

The reaction conditions under which alpha-carbamoyl-alpha, alpha-dichloro-methane sulfenyl chlorides and intermediate products, as described above, are obtained are generally the same. The reaction is normally carried out at a temperature above the freezing point of the system but preferably below the boiling point of the inert organic liquid. Still more preferably, the reaction is carried out at temperatures of from about 0°C. to about 60°C. Since gaseous reaction products are evolved, the reaction is usually carried out at atmospheric pressure, but higher or lower pressures may be utilized if equipment and other factors favor such higher or lower pressures. The reaction may be carried out in an open vessel or under reflux.

The inert organic liquid employed in the overall manufacture of this invention or any portion thereof can be any organic liquid, or mixtures thereof, which is inert under the reaction conditions, and preferably that having a boiling point in the range of from about 30°C. to about 100°C. Ordinarily, the inert organic liquid comprises liquid alkanes or liquid chloroalkanes or various mixtures thereof, for example; n-pentane, 3-ethylpentane, n-hexane, 2-ethylhexane, n-heptane, dichloromethane, 1,1-dichloroethane, chloroform, carbon tetrachloride, isobutyl chloride, and various mixtures thereof. Under certain mild reaction conditions where temperature level is readily controllable, sulfuryl chloride itself may be used as the organic liquid. In general, it is preferable but not necessary that the amount of said inert organic liquid present throughout the course of the reaction be that at least sufficient to maintain the intermediary compounds in solution. It is more preferred that said hydrocarbons contain at least one chloro or bromo and have from 1 to 3 carbon atoms. Still more preferred inert organic liquids include 1,2-dichloroethane, chloroform, and methylene chloride. Even still more preferred as an inert organic liquid is methylene chloride.

When R is methyl or benzyl, the level of chlorine or sulfuryl chloride charged to the reaction system determines whether an alpha-carbamoyl-alpha,alpha-dichloro-methane sulfenyl chloride or an intermediary product is obtained. When less than 3 moles of chlorine either as gaseous chlorine or as sulfuryl chloride per mole of substituted sulfide is charged to the reaction system the intermediary product is the major reaction product. When more than 3 moles of chlorine either as gaseous chlorine or as sulfuryl chloride per mole of substituted sulfide is charged to the reaction system, alpha-substituted carbamoyl alpha,alpha-dichloro-methane sulfenyl chloride is the major reaction product. Since the chlorination appears to proceed in a step-wise fashion, the intermediary product may likewise be obtained even at higher levels of chlorine when reaction conditions are mild; i.e., the temperature is maintained below about 20°C. and reaction time does not exceed about 1 hour.

Alpha-substituted carbamoyl alpha,alpha-dichloromethane sulfenyl chlorides exhibit herbicidal activity toward noxious weeds and have particular utility as selective preemergent herbicides.

As illustrative of this invention, but not limitative thereof is the following:

EXAMPLES 1 THROUGH 8

These examples illustrate the preparation of substituted sulfides having the formula

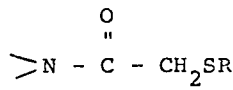

wherein R is hydrogen which sulfides are precursors to the compounds made by the method of this invention.

EXAMPLE 1

To a suitable reaction vessel equipped with a thermometer, agitator and venting means are charged approximately 62 parts by weight of 2,6-dimethylaniline (about ½ mole) and approximately 46 parts by weight of thioglycolic acid (about ½ mole). The contents of the so-charged vessel are heated with agitation under a nitrogen atmosphere to about 130°C. and maintained at that temperature for about 3 hours. The contents are cooled to about room temperature and washed with a dilute aqueous HCl solution. A white solid (melting point of 101° to 109°C.) is isolated by filtration and identified as alpha-mercapto-2',6'-dimethylacetanilide.

Alpha-mercapto-2', 6'-dimethylacetanilide exhibits preemergent herbicidal activity against Johnson grass.

EXAMPLE 2

To a suitable reaction vessel equipped with a thermometer, agitator and venting means are charged approximately 93 parts by weight of aniline (about 1 mole) and approximately 92 parts by weight of thioglycolic acid (about 1 mole). The contents of the so-charged vessel are heated with agitation under a nitrogen atmosphere to about 130°C. and maintained at that temperature for about 4 hours. The contents are cooled to about room temperature and washed with a dilute aqueous HCl solution. A white solid is isolated by filtration, dissolved in and recrystallized from chloroform, and identified as alpha-mercapto-acetanilide (melting point of 107° to 110°C.).

EXAMPLE 3

To a suitable reaction vessel equipped with a thermometer, agitator and venting means are charged approximately 64 parts by weight of para-chloroaniline (about ½ mole) and approximately 46 parts by weight of thioglycolic acid (about ½ mole). The contents of the so-charged vessel are heated with agitation under a nitrogen atmosphere to about 130°C. and maintained at that temperature overnight. The contents are cooled to about room temperature and washed with a dilute aqueous HCl solution. A white solid is isolated by filtration, dissolved in and recrystallized from a mixed solvent of chloroform and ethanol and identified as alpha-mercapto-para-chloroacetanilide (melting point of 127° to 129°C.).

Alpha-mercapto-para-chloroacetanilide exhibits pre-emergent herbicidal activity against Canada thistle.

EXAMPLE 4 ½

To a suitable reaction vessel equipped with a thermometer, agitator and venting means are charged approximately 80 parts by weight of meta-trifluoromethylaniline (about ½ mole) and approximately 45 parts by weight of thioglycolic acid (about ½mole). The contents of the so-charged vessel are heated with agitation under a nitrogen atmosphere to about 130°C. and maintained at that temperature for about 3 hours. The contents are cooled to about 0°C. and washed with a dilute aqueous HCl solution. A white solid is isolated by filtration and identified as alpha-mercapto-meta-trifluoromethylacetanilide (melting point of 35° to 40°C.).

Alpha-mercapto-meta-trifluoromethylacetanilide exhibits pre-emergent herbicidal activity against Canada thistle and Johnson grass and contact herbicidal activity against Canada thistle, cocklebur and lambsquarter.

EXAMPLE 5

To a suitable reaction vessel equipped with a thermometer, agitator and venting means are charged approximately 75 parts by weight of 2,6-diethylaniline (about ½ mole) and approximately 46 parts by weight of thioglycolic acid (about ½ mole). The contents of the so-charged vessel are heated with agitation under a nitrogen atmosphere to about 130° C. and maintained at that temperature overnight. The contents are cooled to about room temperature and washed with a dilute aqueous HCl solution. A white solid is isolated by filtration, dissolved in and recrystallized from ethanol, and identified as alpha-mercapto-2',6'-diethylacetanilide (melting point of 120° to 124°C.).

Alpha-mercapto-2',6'-diethylacetanilide exhibits pre-emergent herbicidal activity against velvet leaf and lambsquarter.

EXAMPLE 6

To a suitable reaction vessel equipped with a thermometer, agitator and venting means are charged approximately 123 parts by weight of para-anisidine (about 1 mole) and approximately 90 parts by weight of thioglycolic acid (about 1 mole). The contents of the so-charged vessel are heated with agitation under a nitrogen atmosphere to about 130°C. and maintained at that temperature for about 3 hours. The contents are cooled to about room temperature and washed with a dilute aqueous HCl solution. A white solid is isolated by filtration and identified as alpha-mercapto para-methoxy-acetanilide (melting point of 111° to 115°C.).

Alpha-mercapto-para-methoxyacetanilide exhibits pre-emergent herbicidal activity against lambsquarter and Johnson grass.

EXAMPLE 7

To a suitable reaction vessel equipped with a thermometer, agitator and venting means are charged approximately 107 parts by weight of para-toluidine (about 1 mole) and approximately 92 parts by weight of thioglycolic acid (about 1 mole). The contents of the so-charged vessel are heated with agitation under a nitrogen atmosphere to about 130°C. and maintained at that temperature for about 3 hours. The contents are cooled to about room temperature and washed with a dilute aqueous HCl solution. A white solid is isolated by filtration and identified as alpha-mercapto-para-methylacetanilide (melting point of 117 to 123° Centigrade). Alpha-mercapto-para-methylacetanilide exhibits pre-emergent herbicidal activity against velvet-leaf.

EXAMPLE 8

In similar fashion, other substituted sulfides having the formula

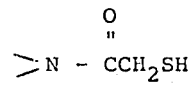

shown in column A may be prepared from thioglycolic acid and the corresponding amine shown in column B. The preparation may be carried out by the procedure of Example 4 except that in place of 80 parts by weight of meta-trifluoromethylaniline an equimolecular portion (about ½ mole) of the secondary amine of column B is added in order to obtain the sulfide of column A.

| A | B |
|---|---|
| N,N-di(isobutoxymethyl)-alpha-mercapto-acetamide | di(isobutoxymethyl) amine |
| N,N-diamyl-alpha-mercapto-acetamide | diamylamine |
| N,N-diisobutyl-alpha-mercapto-acetamide | diisobutylamine |
| N-(3-methoxypropyl)-alpha-mercapto-acetamide | 3-methoxypropylamine |
| N-n-amyl-alpha-mercapto-acetamide | n-amylamine |
| N-ethyl-N-isopropyl-alpha-mercapto-acetamide | N-ethyl-N-isopropylamine |
| N-(mercaptoacetyl)pyrrolidine | pyrrolidine |

EXAMPLES 9 THROUGH 18

These examples illustrate the preparation of substituted sulfides, having the formula

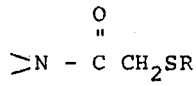

wherein R is methyl or benzyl, which sulfides are precursors to the compounds made by the method of this invention.

EXAMPLE 9

To a suitable reaction vessel equipped with a thermometer, agitator and venting means is charged an aqueous solution containing approximately 500 parts by weight of water, approximately 121 parts by weight of diisopropylamine (about 1.2 moles) and approximately 64 parts by weight of sodium hydroxide. The vessel is cooled to about 0°C. and maintained at this temperature while approximately 180 parts by weight of chloroacetyl chloride is slowly added to the solution. Upon completion of this addition the temperature of the vessel is allowed to rise to about room temperature. The contents of the reaction vessel are extracted with chloroform by suitable means and the aqueous phase is discarded. The chloroform is distilled off and the remaining oil is dissolved in pentane. Upon cooling a white precipitate appears which is isolated by filtration and identified as N,N-diisopropyl-alpha-chloroacetamide (melting point of 48° to 49°C.).

In similar fashion other N-substituted alpha-chloro or bromoacetamides may be prepared as precursors for other substituted sulfides of the formula

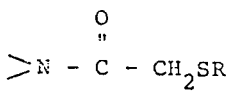

used in the method of the present invention.

To a suitable reaction vessel equipped with a thermometer and agitator charged with an aqueous solution containing approximately 200 parts by weight of water and approximately 19 parts by weight of sodium hydroxide is added with agitation approximately 58 parts by weight of benzyl mercaptan. Thereafter approximately 82.6 parts by weight of N,N-diisopropyl-alpha-chloroacetamide is slowly added with agitation. Thereupon the mass is heated on a steambath and agitated for about 1 hour. Thereafter the mass is cooled to about room temperature and extracted with methylene chloride. The methylene chloride is distilled off leaving an oily residue. The residue is dissolved in pentane, crystallized by cooling in dry ice, isolated by filtration and identified as alpha-(benzylmercapto)-N,N-diisopropylacetamide (melting point of 34° to 37°C.)

Alpha-(benzylmercapto)-N,N-diisopropylacetamide exhibits pre-emergent herbicidal activity against morning glory and Johnson grass as well as insecticidal activity against southern corn rootworm.

EXAMPLE 10

To a suitable reaction vessel equipped with a thermometer and agitator charged with an aqueous solution containing approximately 200 parts by weight of water and approximately 7.1 parts by weight of sodium hydroxide is added with agitation approximately 21.9 parts by weight of benzyl mercaptan. Thereafter approximately 50 parts by weight of alpha-bromo-2'-tert-butyl-6'-methylacetanilide dissolved in ethanol is slowly added with agitation. The vessel warms and a precipitate forms. Thereupon the mass is heated on a steambath and agitated until the precipitate dissolves. Thereafter the mass is cooled to room temperature and the precipitate reforms. A white crystalline solid is isolated by filtration and identified as alpha-(benzylmercapto)-2'-tert-butyl-6'-methylacetanilide (melting point of 127° to 129°C.)

Alpha-(benzylmercapto)-2'-tert-butyl-6'-methylacetanilide exhibits pre-emergent herbicidal activity against Canada thistle, cocklebur, velvet leaf, lambsquarter, smartweed, nutsedge, quackgrass, bromegrass (cheat) and barnyard grass.

EXAMPLE 11

To a suitable reaction vessel equipped with a thermometer and agitator charged with an aqueous solution containing approximately 200 parts by weight of water and approximately 21 parts by weight of sodium hydroxide is added with agitation approximately 62 parts by weight of benzyl mercaptan. Thereafter approximately 60.5 parts by weight of N,N-dimethyl-alpha-chloroacetamide is slowly added with agitation. Thereupon the mass is heated on a steam bath and agitated for about 1 hour. Thereafter the mass is cooled to about room temperature and extracted with methylene chloride. The methylene chloride is distilled off leaving an oily residue. The residue is dissolved in pentane, crystallized by cooling in dry ice, isolated by filtration and identified as N,N-dimethyl-alpha-(benzylmercapto)-acetamide (melting point of 27° to 30°C.).

N,N-dimethyl-alpha-(benzylmercapto)-acetamide exhibits insecticidal activity against southern corn rootworm.

EXAMPLE 12

To a suitable reaction vessel equipped with a thermometer and agitator charged with an aqueous solution containing approximately 200 parts by weight of water and approximately 28 parts by weight of potassium hydroxide is added with agitation approximately 62 parts by weight of benzyl mercaptan. Thereafter approximately 105 parts by weight of alpha-chloro-N-isopropylacetanilide in ethanol solution is slowly added with agitation. Thereupon the mass is refluxed with agitation overnight. Thereafter the mass is cooled to about room temperature and extracted with methylene chloride. The methylene chloride is distilled off leaving an oily residue. The residue is dissolved in pentane, crystallized by cooling in dry ice, isolated by filtration and identified as alpha-(benzylmercapto)-N-isopropylacetanilide (melting point of 39° to 41°C.).

Alpha-(benzylmercapto)-N-isopropylacetanilide exhibits pre-emergent herbicidal activity against quackgrass and barnyard-grass.

EXAMPLE 13

To a suitable reaction vessel equipped with a thermometer and agitator charged with an aqueous solution containing approximately 40 parts by weight of water and approximately 40 parts by weight of sodium hydroxide is added with agitation approximately 63 parts by weight of benzyl mercaptan. Thereafter approximately 134 parts by weight of alpha-chloro-N-methoxymethyl-2',6'-diethylacetanilide dissolved in ethanol is slowly added with agitation. The vessel warms and a precipitate forms. Thereupon the mass is heated on a steam bath and agitated until the precipitate dissolves. Thereafter the mass is cooled to room temperature and extracted with methylene chloride by suitable means. The methylene chloride is distilled off and the remaining oil is dissolved in petroleum ether. Upon cooling with dry ice to about −70°C., a white precipitate appears which is isolated by filtration and identified as alpha-(benzylmercapto)-N-methoxymethyl-2',6'-diethylacetanilide (melting point of 33° to 35°C.).

Alpha-(benzylmercapto)-N-methoxymethyl-2',6'diethylacetanilide exhibits pre-emergent herbicidal activity against velvet leaf, nutsedge, quackgrass and bromegrass (cheat) as well as insecticidal activity against southern corn rootworm.

EXAMPLE 14

Alpha-(methylmercapto)-N,N-diisopropylacetamide is prepared according to the procedure of Example 9 except that in place of 58 parts by weight of benzyl mercaptan an equimolecular amount of methyl mercaptan is added.

EXAMPLE 15

Alpha-(methylmercapto)-2'-tert-butyl-6'- methylacetanilide is prepared according to the procedure of Example 10 except that in place of 21.9 parts by weight of benzyl mercaptan an equimolecular amount of methyl mercaptan is added.

EXAMPLE 16

N,N-dimethyl-alpha-(methylmercapto)-acetamide is prepared according to the procedure of Example 11 except that in place of 62 parts by weight of benzyl mercaptan an equimolecular amount of methyl mercaptan is added.

EXAMPLE 17

Alpha-(methylmercapto)-N-isopropylacetanilide is prepared according to the procedure of Example 12 except that in place of 62 parts by weight of benzyl mercaptan an equimolecular amount of methyl mercaptan is added.

EXAMPLE 18

Alpha-(methylmercapto)-N-methoxymethyl-2',6'-diethylacetanilide is prepared according to the procedure of Example 13 except that in place of 63 parts by weight of benzyl mercaptan an equimolecular amount of methyl mercaptan is added.

In similar fashion other substituted sulfides, having the formula

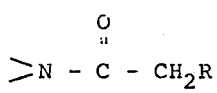

wherein R is methyl or benzyl, may be prepared from the corresponding alpha-haloacetanilide or acetamide and benzyl or methyl mercaptan.

EXAMPLES 19 THROUGH 31

These examples illustrate the preparation of intermediary products having the formula

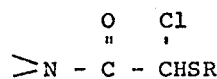

wherein R is methyl or benzyl.

EXAMPLE 19

To a suitable reaction vessel equipped with a thermometer, agitator and venting means is charged approximately 11.6 parts by weight of alpha-(benzylmercapto)-N-isopropylacetanilide dissolved in approximately 275 parts by weight of methylene chloride chloride. While agitating the so-charged mass at about 0°C is slowly added approximately 5.36 parts by weight of sulfuryl chloride. The reaction is exothermic and the temperature during the addition is permitted to rise to about 20°C. Upon completion of the sulfuryl chloride addition the mass is agitated for about one half hour at about room temperature. Thereafter the mass is stripped of volatiles under vacuum to give a solid residue which is identified as alpha-chloro-alpha-(benzylmercapto)-N-isopropylacetanilide (melting point of 86° to 87°C.).

Alpha-chloro-alpha-(benzylmercapto)-N-isopropylacetanilide exhibits pre-emergent herbicidal activity against smartweed and barnyard grass.

EXAMPLE 20

The procedure of Example 19 is followed except that the reaction is carried out under reflux and, instead of charging to the system 5.36 parts by weight of sulfuryl chloride, chlorine gas is bubbled through the refluxing mass until approximately 2.9 parts by weight thereof is absorbed. Alpha-chloro-alpha-(benzylmercapto)-N-isopropylacetanilide is obtained.

EXAMPLE 21

The procedure of Example 19 is followed except that in place of 11.6 parts by weight of alpha-(benzylmercapto)-N-isopropylacetanilide an equimolecular proportion of alpha-(methylmercapto)-N-isopropylacetanilide is dissolved in methylene chloride, alpha-chloro-alpha-(methylmercapto)-N-isopropylacetanilide is obtained.

EXAMPLES 22 THROUGH 31

The procedure of Example 19 is followed except that in place of 11.6 parts of alpha-(benzylmercapto)-N-isopropylacetanilide an equimolecular proportion of the compound of Column A is dissolved in methylene chloride and the compound of column B is obtained.

| EXAMPLE NO. | A | B |
| --- | --- | --- |
| 22 | alpha-(benzylmercapto)-N,N-diisopropylacetamide | alpha-chloro-alpha-(benzylmercapto)-N,N-diisopropylacetamide |
| 23 | alpha-(benzylmercapto)-2'-tert-butyl-6'-methyl-acetanilide | alpha-chloro-alpha-(benzylmercapto)-2'-tert-butyl-6'-methyl-acetanilide |
| 24 | N,N-dimethyl-alpha-(benzylmercapto)-acetamide | N,N-dimethyl-alpha-chloro-alpha-(benzylmercapto)-acetamide |
| 25 | alpha-(benzylmercapto)-N-methoxymethyl-2',6'-diethylacetanilide | alpha-chloro-alpha-(benzylmercapto)-N-methoxymethyl-2',6'-diethylacetanilide |
| 26 | alpha-(methylmercapto)-N,N-diisopropylacetamide | alpha-chloro-alpha-(methylmercapto)-N,N-diisopropylacetamide |
| 27 | alpha-(methylmercapto)-2'-tert-butyl-6'-methyl-acetanilide | alpha-chloro-alpha-(methylmercapto)-2'-tert-butyl-6'-methyl-acetanilide |

| EXAMPLE NO. | A | B |
|---|---|---|
| 28 | N,N-dimethyl-alpha-(methylmercapto)-acetamide | N,N-dimethyl-alpha-chloro-alpha-(methylmercapto)-acetamide |
| 29 | alpha-(methylmercapto)-N-methoxymethyl-2',6'-diethylacetanilide | alpha-chloro-alpha-(methylmercapto)-N-methoxymethyl-2',6'-diethylacetanilide |
| 30 | N-[alpha-(benzylmercapto)-acetyl]pyrrolidine | N-[alpha-chloro-alpha-(benzylmercapto)-acetyl]pyrrolidine |
| 31 | N-[alpha-(methylmercapto)-acetyl]pyrrolidine | N-[alpha-chloro-alpha-(methylmercapto)-acetyl]pyrrolidine |

EXAMPLES 32 THROUGH 44

These examples illustrate the preparation of compounds of this invention having the formula

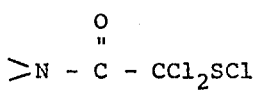

wherein

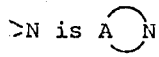

and A is alkylene of the empirical formula $C_nH_{2n}$ wherein n is a whole number from 4 to 8 inclusive, and having from 4 to 8 carbon atoms in a continuous chain between the terminal valence bonds from a substituted sulfide of the formula

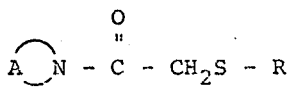

wherein A is as defined above and R is hydrogen, methyl or benzyl and sulfuryl chloride and chlorine.

EXAMPLE 32

To a suitable reaction vessel equipped with a thermometer, agitator and venting means is charged approximately 23.5 parts by weight of N-[alpha-(benzylmercapto)-acetyl]pyrrolidine dissolved in approximately 300 parts by weight of 1,2-dichloroethane. While agitating the so-charged mass at about 0°C is slowly added approximately 40 parts by weight of sulfuryl chloride. The reaction is exothermic and the temperature during the addition is permitted to rise to about 20°C. Upon completion of the sulfuryl chloride addition, the mass is agitated for about 3 hours at about room temperature. Thereafter, the mass is stripped of volatiles under vacuum to give a residue which residue is dissolved in petroleum ether solvent, crystallized by cooling the solution to about −70°C., separated from the solvent by filtration and identified as N-[alpha,alpha-dichloro-alpha-(chloromercapto)-acetyl]pyrrolidine.

EXAMPLE 33

The procedure of Example 32 is followed except that in place of N-[alpha-(benzylmercapto)-acetyl]pyrrolidine an equimolecular proportion of N-[alpha-(methylmercapto)-acetyl]pyrrolidine is dissolved in 1,2-dichloroethane. N-[alpha,alpha-dichloro-alpha-(chloromercapto)-acetyl]pyrrolidine is obtained.

EXAMPLE 34

The procedure of Example 32 is followed except that in place of N-[alpha-(benzylmercapto)-acetyl]pyrrolidine an equimolecular proportion of N-(alpha-mercapto-acetyl)pyrrolidine is dissolved in 1,2-dichloroethane. N-[(alpha,alpha-dichloro-alpha-(chloromercapto)-acetyl]pyrrolidine is obtained.

EXAMPLE 35

The procedure of Example 32 is followed except that the reaction is carried out under reflux and, instead of charging to the system 40 parts by weight of sulfuryl chloride, chlorine gas is bubbled through the refluxing mass until approximately 21 parts by weight thereof is absorbed. N-[alpha,alpha-dichloro-alpha-(chloromercapto)-acetyl]pyrrolidine is obtained.

In similar fashion N-[alpha,alpha-dichloro-alpha-(chloromercapto)-acetyl]pyrrolidine may be prepared from N-(alpha-mercapto-acetyl)pyrrolidine and from N-[alpha-(methylmercapto)-acetyl]pyrrolidine.

EXAMPLES 36 THROUGH 44

The procedure of Example 32 is followed except that in place of N-[alpha-(benzylmercapto)-acetyl]pyrrolidine in the amount of about 23.5 parts by weight, an equimolecular proportion of the compound shown in column A is added. By this method, the corresponding chlorinated compound of column B is prepared.

| EXAMPLE NO. | A | B |
|---|---|---|
| 36 | N-(alpha-mercapto-acetyl)piperidine | N-[alpha,alpha-dichloro-alpha-(chloromercapto)-acetyl]piperidine |
| 37 | N-[alpha-(methylmercapto)-acetyl]hexamethyleneimine | N-[alpha,alpha-dichloro-alpha-(chloromercapto)-acetyl]hexamethyleneimine |
| 38 | N-[alpha-(benzylmercapto)-acetyl]heptamethyleneimine | N-[alpha,alpha-dichloro-alpha-(chloromercapto)-acetyl]heptamethyleneimine |

—Continued

| EXAMPLE NO. | A | B |
|---|---|---|
| 39 | N-[alpha-(methylmercapto)-acetyl]2-ethyl-pyrrolidine | N-[alpha,alpha-dichloro-alpha-(chloromercapto)-acetyl]2-ethyl-pyrrolidine |
| 40 | N-(alpha-mercapto-acetyl)2,5-dimethyl-pyrrolidine | N-[alpha,alpha-dichloro-alpha-(chloromercapto)-acetyl]2,5-dimethylpyrrolidine |
| 41 | N-[alpha-(benzylmercapto)-acetyl]2-ethyl-6-methylpiperidine | N-[alpha,alpha-dichloro-alpha-(chloromercapto)-acetyl]2-ethyl-6-methylpiperidine |
| 42 | N-[alpha-(methylmercapto)-acetyl]4-pipecoline | N-[alpha,alpha-dichloro-alpha-(chloromercapto)-acetyl]4-pipecoline |
| 43 | N-(alpha-mercapto-acetyl)-3,4-dimethyl-hexamethylimine | N-[alpha,alpha-dichloro-alpha-(chloromercapto)-acetyl]3,4-dimethylhexamethyleneimine |
| 44 | N-[alpha-(benzylmercapto)-acetyl]3-pipecoline | N-[alpha,alpha-dichloro-alpha-(chloromercapto)-acetyl]3-pipecoline |

EXAMPLES 45 THROUGH 72

These examples illustrate the preparation of compounds of this invention having the formula

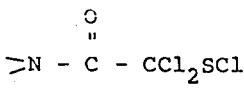

wherein

and B is hydrogen, alkyl of from 1 to 5 carbon atoms, alkoxyalkyl of from 2 to 6 carbon atoms, cyclopentyl, cyclohexyl, naphthyl, phenyl or substituted phenyl wherein the ring substituents thereof total from 1 to 3 which substituents are from 0 to 3 alkyl of from 1 to 6 carbon atoms, from 0 to 3 halogen of atomic weight in the range of 18 to 80, from 0 to 2 nitro, or from 0 to 2 trifluoromethyl and D is hydrogen, alkyl of from 1 to 5 carbon atoms, alkoxyalkyl of from 2 to 6 carbon atoms, cyclopentyl, cyclohexyl, naphthyl, phenyl and substituted phenyl wherein the ring substituents thereof total from 1 to 3, from 0 to 3 alkyl of from 1 to 6 carbon atoms, from 0 to 3 halogen of atomic weight in the range of 18 to 80, from 0 to 2 nitro, and from 0 to 2 trifluoromethyl from a substituted sulfide of the formula

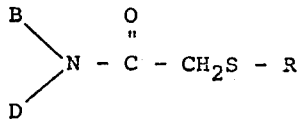

wherein B and D are as defined above and R is hydrogen, methyl or benzyl and sulfuryl chloride and chlorine.

EXAMPLE 45

To a suitable reaction vessel equipped with a thermometer, agitator and venting means is charged approximately 16.7 parts by weight of alpha-mercaptoacetanilide dissolved in approximately 200 parts by weight of methylene chloride. While agitating the so-charged mass at about 0°C. is slowly added approximately 45 parts by weight of sulfuryl chloride. The reaction is exothermic and the temperature during the addition is permitted to rise to about 20°C. Upon completion of the sulfuryl chloride addition, the mass is agitated for about 2 hours at about room temperature. Thereafter, the mass is stripped of volatiles under vacuum to give a solid residue which residue is dissolved in petroleum ether solvent, crystallized by cooling the solution to about −70°C., spearated from the solvent by filtration and identified as alpha,alpha-dichloro-alpha(-chloromercapto)-acetanilide (melting point of 71° to 76°C.)

Alpha,alpha-dichloro-alpha-(chloromercapto)-acetanilide exhibits pre-emergent herbicidal activity against Canada thistle, lambsquarter and quackgrass.

EXAMPLE 46

To a suitable reaction vessel equipped with a thermometer, agitator and venting means is charged approximately 26.3 parts by weight of alpha-mercapto-4'-chloroacetanilide dissolved in approximately 200 parts by weight of methylene chloride. While agitating the so-charged mass at about 0°C. is slowly added approximately 35 parts by weight of sulfuryl chloride. The reaction is exothermic and the temperature during the addition is permitted to rise to about 20°C. Upon completion of the sulfuryl chloride addition, the mass is agitated for about 2 hours at about room temperature. Thereafter, the mass is stripped of volatiles under vacuum to give a liquid residue which residue is dissolved in petroleum ether solvent, crystallized by cooling the solution to about −70°C., separated from the solvent by filtration and identified as alpha,alpha,4'-trichloro-alpha-(chloromercapto)-acetanilide (melting point of 71° to 73°C.).

Alpha,alpha,4'-trichloro-alpha-(chloromercapto)-acetanilide, exhibits pre-emergent herbicidal activity against Canada thistle and contact herbicidal activity against lambsquarter and barnyard grass.

EXAMPLE 47

To a suitable reaction vessel equipped with a thermometer, agitator and venting means is charged approximately 47 parts by weight of alpha-mercapto-meta-trifluoromethylacetanilide dissolved in approximately 300 parts by weight of methylene chloride. While agitating the so-charged mass at about 0°C. is slowly added approximately 81 parts by weight of sulfuryl chloride. The reaction is exothermic and the temperature during the addition is permitted to rise to about 20°C. Upon completion of the sulfuryl chloride addition, the mass is agitated for about 2 hours at room temperature. Thereafter, the mass is stripped of volatiles under vacuum to give a solid residue which residue is dissolved in petroleum ether solvent, crystallized by cooling the solution to about −70°C., separated from the solvent by filtration and identified as alpha,alpha-dichloro-alpha-(chloromercapto)-meta-trifluoromethylacetanilide (melting point of 60° to 62°C.).

Alpha,alpha-dichloro-alpha-(chloromercapto)-meta-trifluoromethylacetanilide exhibits pre-emergent herbicidal activity against Canada thistle and Johnson grass and contact herbicidal activity against Canada thistle, cocklebur, morning glory, and lambsquarter.

EXAMPLE 48

To a suitable reaction vessel equipped with a thermometer, agitator and venting means is charged approximately 22 parts by weight of alpha-mercapto-2',6'-diethylacetanilide dissolved in approximately 300 parts by weight of 1,2-dichloroethane. While agitating the so-charged mass at about 0°C. is slowly added approximately 41 parts by weight of sulfuryl chloride. The reaction is exothermic and the temperature during the addition is permitted to rise to about 20°C. Upon completion of the sulfuryl chloride addition, the mass is agitated for about 2 hours at about room temperature. Thereafter, the mass is stripped of volatiles under vacuum to give a solid residue which residue is washed with pentane and identified as alpha,alpha-dichloro-alpha-(chloromercapto)-2',6'-diethylacetanilide (melting point of 159° to 162°C.).

Alpha,alpha-dichloro-alpha-(chloromercapto)-2',6'-diethylacetanilide exhibits pre-emergent herbicidal activity against lambsquarter and downy brome.

EXAMPLE 49

To a suitable reaction vessel equipped with a thermometer, agitator and venting means is charged approximately 39 parts by weight of alpha-mercapto-2',6'-dimethylacetanilide dissolved in approximately 300 parts by weight of chloroform. While agitating the so-charged mass at about 0°C. is slowly added approximately 81 parts by weight of sulfuryl chloride. The reaction is exothermic and the temperature during the addition is permitted to rise to about 20°C. Upon completion of the sulfuryl chloride addition, the mass is agitated for about 2 hours at about room temperature. Thereafter, the mass is stripped of volatiles under vacuum to give a solid residue which residue is dissolved in carbon tetrachloride solvent, crystallized by cooling the solution to about −70°C., separated from the solvent by filtration and identified as alpha,alpha-dichloro-alpha-(chlorothio)-2,6-dimethylacetanilide (melting point of 115° to 117°C.).

Alpha,alpha-dichloro-alpha-(chloromercapto)-2',6'-dimethylacetanilide exhibits pre-emergent herbicidal activity against Canada thistle and lambsquarter.

EXAMPLE 50

To a suitable reaction vessel equipped with a thermometer, agitator and venting means is charged approximately 39.4 parts by weight of alpha-mercapto-para-methoxyacetanilide dissolved in approximately 300 parts by weight of methylene chloride. While agitating the so-charged mass at about 0°C. is slowly added approximately 81 parts by weight of sulfuryl chloride. The reaction is exothermic and the temperature during the addition is permitted to rise to about 20°C. Upon completion of the sulfuryl chloride addition, the mass is agitated for about 2 hours at about room temperature. Thereafter, the mass is stripped of volatiles under vacuum to give a liquid residue which residue is dissolved in hot petroleum ether solvent, crystallized by cooling the solution to about −70°C., separated from the solvent by filtration and identified as alpha,alpha-dichloro-alpha-(chloromercapto)-para-methoxyacetanilide.

Alpha,alpha-dichloro-alpha-(chloromercapto)-para-methoxyacetanilide exhibits pre-emergent herbicidal activity against Canada thistle, lambsquarter and Johnson grass.

EXAMPLE 51

To a suitable reaction vessel equipped with a thermometer, agitator and venting means is charged approximately 76.4 parts by weight of alpha-mercapto-para-methylacetanilide. While agitating the so-charged mass at about 0°C is slowly added approximately 110 parts by weight of sulfuryl chloride. The reaction is exothermic and the temperature during the addition is permitted to rise to about 20°C. Upon completion of the sulfuryl chloride addition, the mass is agitated for about 2 hours at about room temperature. Thereafter, the oily mass is extracted with petroleum ether solvent and a solid is crystallized by cooling the solution to about −70°C., separated from the solvent by filtration and identified as alpha,alpha-dichloro-alpha-(chloromercapto)-para-methylacetanilide.

Alpha,alpha-dichloro-alpha-(chloromercapto)-para-methylacetanilide exhibits pre-emergent herbicidal activity against Johnson grass.

EXAMPLE 52

To a suitable reaction vessel equipped with a thermometer, agitator and venting means is charged approximately 86 parts by weight of alpha-mercapto-para-bromoacetanilide dissolved in approximately 300 parts by weight of methylene chloride. While agitating the so-charged mass at about 0°C is slowly added approximately 30 parts by weight of sulfuryl chloride. The reaction is exothermic and the temperature during the addition is permitted to rise to about 20°C. Upon completion of the sulfuryl chloride addition, the mass is agitated for about 3 hours at about room temperature. Thereafter, the mass is stripped of volatiles under vacuum to give a dark solid residue which residue is boiled with petroleum ether solvent for 5 minutes crystallized by cooling the solution to about −70°C., separated from the solvent by filtration and after the fifth repetition of the extraction, identified as alpha,-alpha-dichloro-alpha-(chloromercapto)-para-bromoacetanilide (melting point of 85° to 87°C.).

EXAMPLE 53

To a suitable reaction vessel equipped with a thermometer, agitator and venting means is charged approximately 16.3 parts by weight of alpha-(benzylmercapto)-2'-tert-butyl-6'-methylacetanilide dissolved in approximately 200 parts by weight of methylene chloride. While agitating the so-charged mass at about 0°C is slowly added approximately 20.1 parts by weight of sulfuryl chloride. The reaction is exothermic and the temperature during the addition is permitted to rise to about 20°C. Upon completion of the sulfuryl chloride addition, the mass is agitated for about 2 hours at about room temperature. Thereafter, the mass is stripped of volatiles under vacuum to give a solid residue which residue is washed with petroleum ether and identified as alpha,alpha-dichloro-alpha-(2'-tert-butyl-6'-methylbenzamido)methane sulfenyl chloride (melting point of 196° to 198°C.).

Alpha,alpha-dichloro-alpha-(2'-tert-butyl-6'-methylbenzamido)methane sulfenyl chloride exhibits pre-emergent herbicidal acitivity against a wide range of species including Canada thistle, nutsedge, lambsquarter, smartweed, velvet leaf, bromegrass (cheat), and barnyard grass, as well as insecticidal activity against southern corn root worm.

EXAMPLE 54

To a suitable reaction vessel equipped with a thermometer, agitator and venting means is charged approximately 21.1 parts by weight of N,N-dimethyl-alpha-(benzylmercapto)-acetamide dissolved in approximately 300 parts by weight of 1,2-dichloroethane. While agitating the so-charged mass at about 0°C is slowly added approximately 40.2 parts by weight of sulfuryl chloride. The reaction is exothermic and the temperature during the addition is permitted to rise to about 20°c. Upon completion of the sulfuryl chloride addition, the mass is agitated for about 1 hour at about room temperature. Thereafter, the mass is stripped of volatiles under vacuum to give a liquid residue which residue is dissolved in petroleum ether solvent, crystallized by cooling the solution to about −70°C., separated from the solvent by filtration and identified as N,N-dimethyl-alpha-alpha-dichloro-alpha-carbamoyl methane sulfenyl chloride (melting point of 47° to 48°C.).

N,N-dimethyl-alpha,alpha-dichloro-alpha-carbamoyl methane sulfenyl chloride exhibits insecticidal activity against southern corn root worm.

EXAMPLE 55

To a suitable reaction vessel equipped with a thermometer, agitator and venting means is charged approximately 15.0 parts by weight of alpha-(benzylmercapto)-N-isopropylacetanilide dissolved in approximately 200 parts by weight of methylene chloride. While agitating the so-charged mass at about 0°C is slowly added approximately 13.4 parts by weight of sulfuryl chloride. The reaction is exothermic and the temperature during the addition is permitted to rise to about 20°C. Upon completion of the sulfuryl chloride addition, the mass is agitated for about 3 hours at about room temperature. Thereafter, the mass is stripped of volatiles under vacuum to give a low melting solid residue. An additional 6 parts by weight of sulfuryl chloride and 100 parts by weight methylene chloride is added and the mass is agitated overnight at room temperature. The mass is stripped of volatiles under vacuum to give a solid residue which residue is washed with petroleum ether solvent, and identified as alpha,alpha-dichloro-alpha-(chloromercapto)-N-isopropylacetanilide (melting point of 121° to 122°C.).

Alpha,alpha-dichloro-alpha-(chlorothio)-N-isopropylacetanilide exhibits pre-emergent herbicidal activity against cocklebur, smartweed, nutsedge, quackgrass, downy brome, and barnyard grass as well as contact herbicidal activity against lambsquarter and Johnson grass.

EXAMPLE 56

To a suitable reaction vessel equipped with a thermometer, agitator and venting means is charged approximately 26.5 parts by weight of N,N-diisopropyl-alpha-(benzylmercapto)-acetamide dissolved in approximately 200 parts by weight of methylene chloride. While agitating the so-charged mass at about 0°C is slowly added 40.2 parts by weight of sulfuryl chloride. The reaction is exothermic and the temperature during the addition is permitted to rise to about 20°C. Upon completion of the sulfuryl chloride addition, the mass is agitated for about 1 hour at about room temperature. Thereafter, the mass is stripped of volatiles under vacuum leaving a slurry to which slurry is added about 100 parts by weight of pentane. A precipitate forms which precipitate is separated from the pentane by filtration and identified as N,N-diisopropyl-alpha,alpha-dichloro-alpha-carbamoyl methane sulfenyl chloride (melting point of 131° to 134°C.).

N,N-diisopropyl-alpha,alpha-dichloro-alpha-carbamoyl methane sulfenyl chloride exhibits insecticidal activity against southern corn root worm.

EXAMPLE 57

To a suitable reaction vessel equipped with a thermometer, agitator and venting means is charged approximately 18.1 parts by weight of alpha-(benzylmercapto)-acetamide dissolved in approximately 200 parts by weight of methylene chloride. While agitating the so-charged mass at about 0°C is slowly added approximately 40.2 parts by weight of sulfuryl chloride. The reaction is exothermic and the temperature during the addition is permitted to rise to about 20°C. Upon completion of the sulfuryl chloride addition, the mass is agitated for about 1 hour at about room temperature. Thereafter, the mass is stripped of volatiles under vacuum leaving a slurry which slurry is first washed with and then dissolved in petroleum ether solvent, crystallized by cooling the solution to about −70°C., separated from the solvent by filtration and identified as alpha,alpha-dichloro-alpha-carbamoyl methane sulfenyl chloride.

EXAMPLE 58

To a suitable reaction vessel equipped with a thermometer, agitator and venting means is charged approximately 35.7 parts by weight of alpha-(benzylmercapto)-N-(methoxymethyl)-2',6'-diethylacetanilide dissolved in approximately 200 parts by weight of methylene chloride. While agitating the so-charged mass at about 0°C is slowly added approximately 40.2 parts by weight of sulfuryl chloride. The reaction is exothermic and the temperature during the addition is permitted to rise to about 20°C. Upon completion of the sulfuryl chloride addition, the mass is agitated overnight at about room temperature. Thereafter, the mass is stripped of volatiles under vacuum to give a liquid residue which residue is dissolved in petroleum ether solvent, crystallized by cooling the solution to about −70°C., separated from the solvent by filtration and identified as alpha, alpha-dichloro-alpha-(chloromercapto)-N-(methoxymethyl)-2',6'-diethylacetanilide (melting point of 63° to 65°C.).

Alpha, alpha-dichloro-alpha-(chloromercapto)-N-(methoxymethyl)-2',6'-diethylacetanilide exhibits pre-emergent herbicidal activity against Canada thistle, velvet leaf, morning glory, lambsquarter, smartweed, nutsedge, quackgrass, bromegrass (cheat) and barnyard grass as well as insecticidal activity against southern corn root worm.

In similar fashion the alpha-(substituted carbamoyl)-alpha, alpha-dichloro-methane sulfenyl chlorides of column B may be prepared from the substituted sulfides of column A and sulfuryl chloride in molecular proportion of at least 3 to 1 of sulfuryl chloride to substituted sulfide.

chloride, chlorine gas is bubbled through the refluxing mass until approximately 18 parts by weight thereof is absorbed. Alpha,alpha,4'-trichloro-alpha-(chloromercapto)-acetanilide is obtained.

EXAMPLE 61

The procedure of Example 47 is followed except that the reaction is carried out under reflux and instead of charging to the system 81 parts by weight of sulfuryl chloride, chlorine gas is bubbled through the refluxing

| A | B |
|---|---|
| alpha-(methylmercapto)-N-(methoxymethyl)-2',6'-diethyl-acetanilide | alpha,alpha-dichloro-alpha(chloromercapto)-N-(methoxymethyl)-2',6'-diethylacetanilide |
| alpha-(methylmercapto)-acetamide | alpha,alpha-dichloro-alpha-(chloromercapto)-acetamide |
| alpha-(methylmercapto)-N-isopropylacetanilide | alpha,alpha-dichloro-alpha-(chloromercapto)-N-isopropyl-acetanilide |
| N,N-dimethyl-alpha-(methylmercapto)-acetamide | N,N-dimethyl-alpha,alpha-dichloro-alpha-carbamoyl methane sulfenyl chloride |
| alpha-(methylmercapto)-2'-tert-butyl-6-methyl acetanilide | alpha,alpha-dichloro-alpha-(2'-tert-butyl-6'-methylbenzamido)-methane sulfenyl chloride |
| alpha-(benzylmercapto)-4'-bromo-acetanilide | alpha,alpha-dichloro-alpha-(chloromercapto)-4'-bromo-acetanilide |
| alpha-(methylmercapto)-2',6'-dichloroacetanilide | alpha,alpha-dichloro-alpha-(chloromercapto)-2',6'-dichloro-acetanilide |
| alpha-(methylmercapto)-4'-methyl-acetanilide | alpha,alpha-dichloro-alpha-(chloromercapto)-4'-methyl-acetanilide |
| alpha-(benzylmercapto)-3'-ethyl-acetanilide | alpha,alpha-dichloro-alpha-(chloromercapto)-3'-ethyl-acetanilide |
| alpha-(benzylmercapto)-N-cyclopentylacetamide | alpha,alpha-dichloro-alpha-(chloromercapto)-N-cyclopentyl-acetamide |
| alpha-mercapto-N-cyclohexyl-acetanilide | alpha,alpha-dichloro-alpha-(chloromercapto)-N-cyclohexyl-acetanilide |
| alpha-(methylmercapto)-N-naphthyl-acetamide | alpha,alpha-dichloro-alpha-(chloromercapto)-N-naphthyl-acetamide |
| alpha-(methylmercapto)-N,N-dicyclohexyl-acetamide | alpha,alpha-dichloro-alpha-(chloromercapto)-N,N-dicyclohexylacetamide |
| alpha-(methylmercapto)-N-2,6-dinitrophenyl-acetamide | alpha,alpha-dichloro-alpha-(chloromercapto)-N-2,6-dinitrophenyl-acetamide |
| alpha-(methylmercapto)-acetanilide | alpha,alpha-dichloro-alpha-(chloromercapto)-acetanilide |
| alpha-(benzylmercapto)-2',4',5'-chloroacetanilide | alpha,alpha-dichloro alpha-(chloromercapto)-2',4',5'-trichloroacetanilide |
| alpha-(methylmercapto)-2',6'-di(trifluoromethyl)-acetanilide | alpha,alpha,dichloro-alpha-(chloromercapto)-2',6'-di-(trifluoromethyl)-acetanilide |
| alpha-(methylmercapto)-N,N-di-(methoxymethyl)acetamide | alpha,alpha-dichloro-alpha-(chloromercapto)-N,N-di-(methoxymethyl)-acetamide |
| alpha-(methylmercapto)-N,N-di-(tert-butyl)acetamide | alpha,alpha-dichloro-alpha-(chloromercapto)-N,N-di-(tert-butyl)acetamide |

EXAMPLE 59

The procedure of Example 45 is followed except that the reaction is carried out under reflux and instead of charging to the system 45 parts by weight of sulfuryl chloride, chlorine gas is bubbled through the refluxing mass until approximately 24 parts by weight thereof is absorbed. Alpha,alpha-dichloro-alpha-(chloromercapto)-acetanilide is obtained.

EXAMPLE 60

The procedure of Example 46 is followed except that the reaction is carried out under reflux and instead of charging to the system 35 parts by weight of sulfuryl mass until approximatelyly 42 parts by weight thereof is absorbed. Alpha,alpha-dichloro-alpha-(chloromercaptol)-meta-trifluoromethylacetanilide is obtained.

EXAMPLE 62

The procedure of Example 48 is followed except that the reaction is carried out under reflux and instead of charging to the system 41 parts by weight of sulfuryl chloride, chlorine gas is bubbled through the refluxing mass until approximately 21 parts by weight thereof is absorbed. Alpha, alpha-dichloro-alpha-(chloromercapto)-2',6'-diethylacetanilide is obtained.

EXAMPLE 63

The procedure of Example 49 is followed except that the reaction is carried out under reflux and instead of charging to the system 81 parts by weight of sulfuryl chloride, chlorine gas is bubbled through the refluxing mass until approximately 42 parts by weight thereof is absorbed. Alpha,alpha-dichloro-alpha-(chloromercapto)-2',6'-dimethylacetanilide is obtained.

EXAMPLE 64

The procedure of Example 50 is followed except that the reaction is carried out under reflux and instead of charging to the system 81 parts by weight of sulfuryl chloride, chlorine gas is bubbled through the refluxing mass until approximately 42 parts by weight thereof is absorbed. Alpha,alpha-dichloro-alpha-(chloromercapto)-para-methoxyacetanilide is obtained.

EXAMPLE 65

The procedure of Example 51 is followed except that the reaction is carried out under reflux and instead of charging to the system 110 parts by weight of sulfuryl chloride, chlorine gas is bubbled through the refluxing mass until approximately 58 parts by weight thereof is absorbed. Alpha,alpha-dichloro-alpha-(chloromercapto)-para-methylacetanilide is obtained.

EXAMPLE 66

The procedure of Example 52 is followed except that the reaction is carried out under reflux and instead of charging to the system 30 parts by weight of sulfuryl chloride, chlorine gas is bubbled through the refluxing mass until approximately 16 parts by weight thereof is absorbed. Alpha, alpha-dichloro-alpha-(chloromercapto)-para-bromoacetanilide is obtained.

EXAMPLE 67

The procedure of Example 53 is followed except that the reaction is carried out under reflux and instead of charging to the system 20.1 parts by weight of sulfuryl chloride, chlorine gas is bubbled through the refluxing mass until approximately 11 parts by weight thereof is absorbed. Alpha,alpha-dichloro-alpha-(2'-tert-butyl-6'-methylbenzamido)methane sulfenyl chloride is obtained.

EXAMPLE 68

The procedure of Example 58 is followed except that the reaction is carried out under reflux and instead of charging to the system 40.2 parts by weight of sulfuryl chloride, chlorine gas is bubbled through the refluxing mass until approximately 21 parts by weight thereof is absorbed. Alpha, alpha-dichloro-alpha-(chloromercapto)-N-(methoxymethyl)-2',6'-diethylacetanilide is obtained.

EXAMPLE 69

To a suitable reaction vessel equipped with a thermometer, agitator and reflux condenser is charged approximately 5 parts by weight of alpha-(benzylthio)-N-isopropylacetanilide dissolved in approximately 100 parts by weight of methylene chloride. The so-charged mass is heated to reflux and while refluxing gaseous chlorine is sparged into the refluxing mass for about 1 hour. The mass is then stripped of volatiles to give a solid residue. The residue is washed with petroleum ether and identified as alpha,alpha-dichloro-alpha-(chloro-mercapto)-N-isopropylacetanilide (melting point of 121°–123°C).

In similar fashion the alpha-(substituted carbamoyl) alpha,alpha-dichloro-methane sulfenyl chlorides of column B may be prepared from the substituted sulfides of column A and chlorine.

| A | B |
|---|---|
| alpha-(methylmercapto)-N-methoxymethyl)-2',6'-diethylacetanilide | alpha,alpha-dichloro-alpha-(chloromercapto)-N-(methoxymethyl)-2',6'-diethylacetanilide |
| alpha-(methylmercapto)-acetamide | alpha,alpha-dichloro-alpha-(chloromercapto)-acetamide |
| alpha-(methylmercapto)-N-isopropylacetanilide | alpha,alpha-dichloro-alpha-(chloromercapto)-N-isopropylacetanilide |
| N,N-dimethyl-alpha-(methylmercapto)-acetamide | N,N-dimethyl-alpha,alpha-dichloro-alpha-carbamoyl methane sulfenyl chloride |
| alpha-(methylmercapto)-2'-tert-butyl-6'-methylacetanilide | alpha,alpha-dichloro-alpha-(2'-tert-butyl-6'-methylbenzamido)-methane sulfenyl chloride |
| alpha-(benzylmercapto)-4'-bromoacetanilide | alpha,alpha-dichloro-alpha-(chloromercapto)-4'-bromoacetanilide |
| alpha-(methylmercapto)-2',6'-dichloroacetanilide | alpha,alpha-dichloro-alpha-(chloromercapto)-2',6'-dichloroacetanilide |
| alpha-(methylmercapto)-4'-methylacetanilide | alpha,alpha-dichloro-alpha-(chloromercapto)-4'-methylacetanilide |
| alpha-(benzylmercapto)-3'-ethylacetanilide | alpha,alpha-dichloro-alpha-(chloromercapto)-3'-ethylacetanilide |
| alpha-(benzylmercapto)-N-cyclopentylacetamide | alpha,alpha-dichloro-alpha-(chloromercapto)-N-cyclopentylacetamide |
| alpha-mercapto-N-cyclohexylacetanilide | alpha,alpha-dichloro-alpha-(chloromercapto)-N-cyclohexylacetanilide |
| alpha-(methylmercapto)-N-naphthylacetamide | alpha,alpha-dichloro-alpha-(chloromercapto)-N-naphthylacetamide |

-Continued

| A | B |
|---|---|
| alpha-(methylmercapto)-N,N-dicyclohexylacetamide | alpha,alpha-dichloro-alpha-(chloromercapto)-N,N-dicyclohexylacetamide |
| alpha-(methylmercapto)-acetanilide | alpha,alpha-dichloro-alpha-(chloromercapto)-acetanilide |
| alpha-(benzylmercapto)-2',4',5'-trichloroacetanilide | alpha,alpha-dichloro-alpha-(chloromercapto)-2',4',5'-trichloroacetanilide |
| alpha-(methylmercapto)-3',5'-di(trifluoromethyl)acetanilide | alpha,alpha-chloro-alpha-(chloromercapto)-3',5'-di(trifluoromethyl)-acetanilide |
| alpha-(methylmercapto)-N,N-di(methoxymethyl)-acetamide | alpha,alpha-dichloro-alpha-(chloromercapto)-N,N-di(methoxymethyl)-acetamide |
| alpha-(methylmercapto)-N,N-di(tert-butyl)-acetamide | alpha,alpha-dichloro-alpha-(chloromercapto)-N,N-di(tert-butyl)-acetamide |

EXAMPLE 70

The procedure for testing post-emergence herbicidal activity of various compounds of this invention is as follows. The active ingredients are applied in spray form to 28 day old specimens of various plant species. The spray, an acetone-water solution containing active ingredient and a surfactant (65 parts tall oil condensed with ethylene oxide in the ratio of 11 moles ethylene oxide to 1 mole tall oil) is applied to the plants in different sets of pans at a rate of 3.6 pounds per acre of active ingredient. The treated plants are placed in a greenhouse and the effects are observed and recorded after approximately 14 days or approximately 28 days.

EXAMPLE 71

The procedure for testing pre-emergent herbicidal activity of representative alpha-carbamoyl-alpha,alpha-dichloro-methanesulfenyl chlorides of this invention and their intermediaries is as follows:

A good grade of top soil is placed in aluminum pans and compacted to a depth of three-eighths to one-half inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

EXAMPLE 72

The procedure for testing insecticidal activity of representative alpha-carbamoyl-alpha,alpha-dichloromethane sulfenyl chlorides and intermediate products of this invention against the southern corn rootworm is as follows:

To a growth pouch (diSPo Seed-Pak growth pouch, catalog No. B1220, of Scientific Products Division of American Hospital Supply Corporation, Evanston, Ill.) in an upright position is added 20 ml. of distilled water. Thereafter is added 0.1 ml. of an acetone solution of known concentration in percent by weight of a compound of this invention (for example a 0.1 ml. of a 0.1% by weight acetone solution of the compound provides a concentration of 5.0 ppm. thereof). In the trough of the pouch formed by the paper wick thereof are placed two corn seeds (Zea mays, Hybrid U.S. 13) about 1 inch apart. Thereupon to the trough and between the seeds is added 8 to 12 ready-to-hatch eggs of the southern corn rootworm (Diabrotica undecimpunctata howardi) which eggs are washed (with distilled water) free of the soil in which they are incubated at room temperature for 21 days immediately prior to their placement in the trough. The so-charged growth pouch is then placed in an upright position in an incubator maintained at 80°F. and 70% relative humidity for 14 days. Immediately thereafter the growth pouches are removed and the extent of kill of the corn rootworm larvae is observed.

While this invention has been described with respect to certain embodiments it is to be understood that it is not so limited and that variations and modifications thereof obvious to those skilled in the art to which this invention appertains can be made without departing from the spirit or scope thereof.

What is claimed is:

1. A compound of the formula

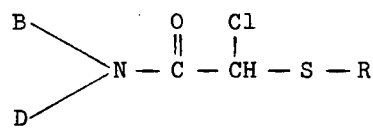

wherein R is methyl or benzyl, B is alkoxyalkyl of from 2 to 6 carbon atoms and D is alkoxyalkyl of from 2 to 6 carbon atoms or di-substituted phenyl, the two ring substituents thereof being alkyl of from 1 to 6 carbon atoms.

2. A compound of the formula

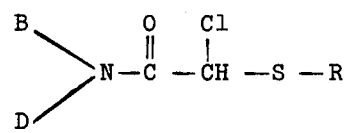

wherein R is methyl or benzyl, B is alkyl of from 1 to 5 carbon atoms and D is phenyl or alkoxyalkyl of three carbon atoms.

3. A compound of the formula

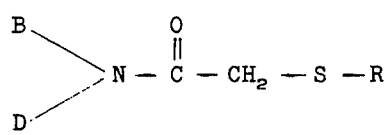

wherein R is methyl or benzyl, B is alkoxyalkyl of from 2 to 6 carbon atoms and D is alkoxyalkyl of from 2 to 6 carbon atoms or di-substituted phenyl, the two ring substituents thereof being alkyl of from 1 to 6 carbon atoms.

4. A compound of the formula

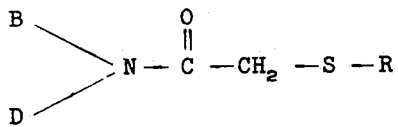

wherein R is methyl or benzyl, B is alkyl of from 1 to 5 carbon atoms and D is phenyl or alkoxyalkyl of three carbon atoms.

5. A compound of claim 2 wherein B is primary alkyl of from 1 to 5 carbon atoms and wherein D is alkoxyalkyl of three carbon atoms.

6. A compound of claim 1 wherein B and D are like alkoxyalkyl of from 2 to 6 carbon atoms.

7. A compound of claim 2 wherein B is alkyl of from 1 to 5 carbon atoms and wherein D is phenyl.

8. A compound of claim 1 wherein B is alkoxyalkyl of from 2 to 6 carbon atoms and wherein D is di-substituted phenyl, the two ring substituents thereof being alkyl of from 1 to 6 carbon atoms.

9. A compound of claim 4 wherein B is primary alkyl of from 1 to 5 carbon atoms and wherein D is alkoxyalkyl of 3 carbon atoms.

10. A compound of claim 3 wherein B and D are like alkoxyalkyl of from 2 to 6 carbon atoms.

11. A compound of claim 4 wherein B is alkyl of from 1 to 5 carbon atoms and wherein D is phenyl.

12. A compound of claim 3 wherein B is alkoxyalkyl of from 2 to 6 carbon atoms and wherein D is di-substituted phenyl, the two ring substituents thereof being alkyl of from 1 to 6 carbon atoms.

* * * * *